Dec. 19, 1967          R. E. TOWNSEND          3,358,565
                        REDUNDANT ACTUATOR
Filed March 8, 1966                          2 Sheets-Sheet 1

INVENTOR.
RICHARD E. TOWNSEND
BY
Darby and Darby
ATTORNEYS

Dec. 19, 1967 R. E. TOWNSEND 3,358,565
REDUNDANT ACTUATOR
Filed March 2, 1966 2 Sheets-Sheet 2
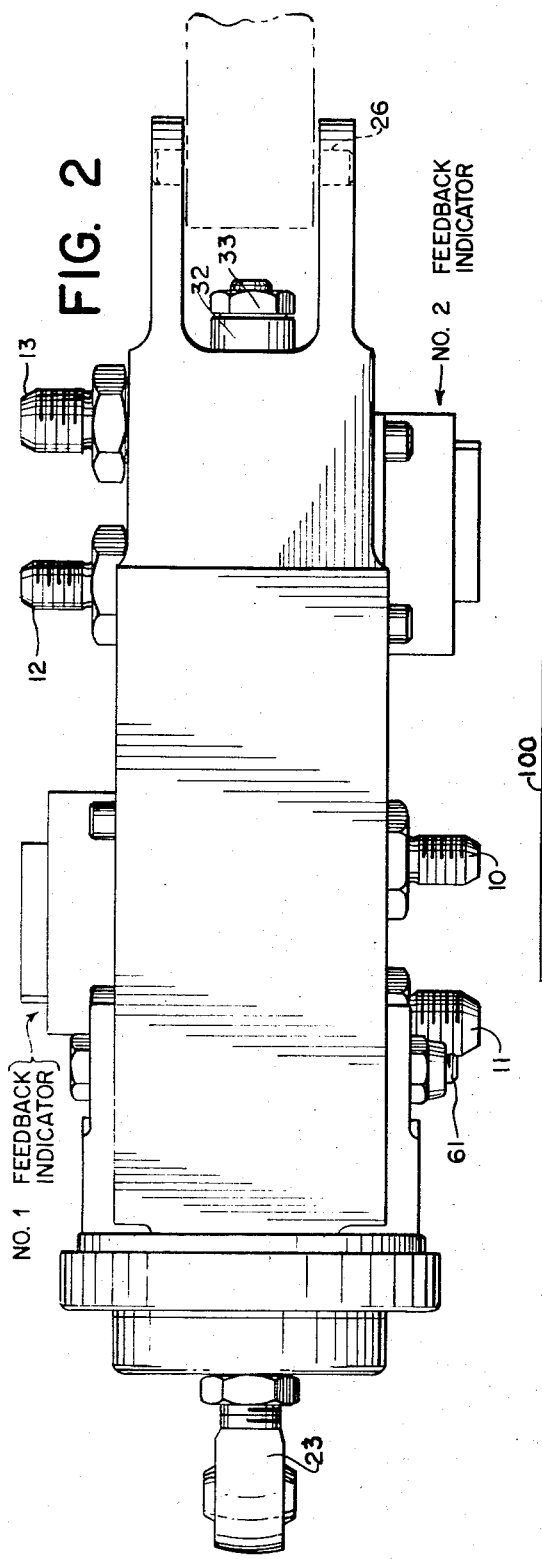
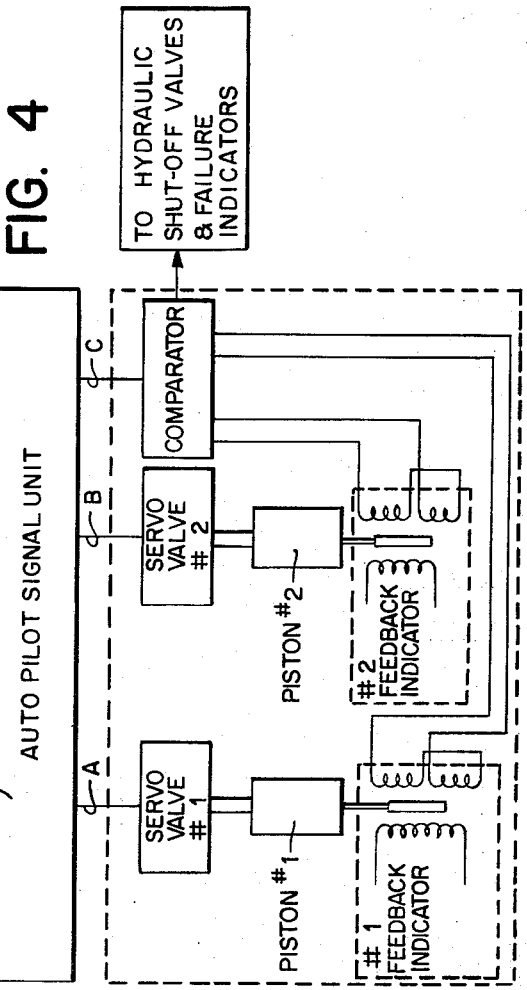
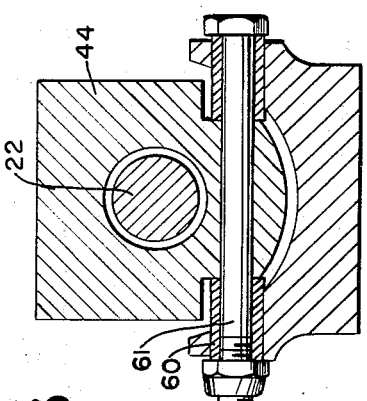
INVENTOR.
RICHARD E. TOWNSEND
BY
Darby and Darby
ATTORNEYS United States Patent Office 3,358,565
Patented Dec. 19, 1967

1

3,358,565
REDUNDANT ACTUATOR
Richard E. Townsend, Huntington, N.Y., assignor to Fairchild Hiller Corporation, a corporation of Maryland
Filed Mar. 8, 1966, Ser. No. 532,760
10 Claims. (Cl. 91—411)

This invention relates to actuating linkages and more specifically to mechanisms for transmitting output signals in response to a plurality of input signals, the actuator having a built-in fail operative system if one or more of the input signals fails.

The principal object of this invention is illustrated by reference to its use in supersonic combat aircraft control systems. When an aircraft is operated at supersonic speed, it is highly desirable that the control surfaces of the aircraft be automatically controlled by an electromechanical actuating mechanism to assure accurate stability during such high speed operation. The pilot's ability to control the aircraft must be augmented by an electro-responsive sensing arrangement to maintain the desired flight path. This is particularly important in terrain following supersonic aircraft flying at near ground level, where a slight downward change in aircraft attitude could result in a crash before corrective action could be taken by the pilot. Consequently, aircraft control systems which couple radar inputs to a computer, which in turn furnishes electronic inputs through a flight control system are essential.

Automatic flight control systems employing radar are conventional. The pilot controls the general attitude of the craft by manipulating the appropriate control mechanism. Slight variations from this attitude caused by external forces are then corrected for by the electro-mechanical automatic control system.

Typically in such systems there are a plurality of identical inputs to the automatic control system. This plural type of control is referred to as control redundancy. For example, in a typical triple redundant system there are three identical inputs, the first serves as the input signal to the number one power supply means such as a servo motor, the second input serves the number two power supply (servo motor), and the third input goes to the comparator. The function of the comparator is to compare the input signal which it receives with the output signals received from one or both of the two servo motors. If the output signal of one of the servo motors indicates a malfunction, the comparator recognizes this and deactivates the malfunctioning servo motor. When both servo motors are functioning properly, the comparator simply analyzes it and does nothing more than monitor the properly functioning system.

The function of an actuator is to produce an output signal in response to the action of the servo motors (assuming both are functioning properly). This is done by varying the distance between the connection points on the actuator, that is, this distance varies proportionally to the power furnished by the servos. Another function of the actuator is to deactivate one of the servo motors, if that servo motor malfunctions. The actuator must then be driven solely by the second (operative) servo motor. Finally, the actuator must also provide for operation when both servo motors are malfunctioning. In this case the actuator allows manual control which overrides both of the deactivated malfunctioning servo motors.

This type of control actuator is referred to as a triple redundant actuator, since it permits two successive modes of automatic operation, first with both servos in operation, and then with one servo in operation while the other is deactivated, and finally as a third mode of operation, manual control.

2

While the actuators of the type herein disclosed and claimed are particularly useful in aircraft, it should be understood that these actuators are suitable for other purposes wherever redundant operation is desired. The actuator is well adapted to a variety of such uses, because of its simple, compact, and inexpensive construction.

These and other objects of this invention will be understood more thoroughly in the light of the following detailed description taken in conjunction with the accompanying drawings in which:

FIG. 2 is a top view of the actuator shown in FIGURE 1;

FIG. 3 is the sectional view of the actuator shown in FIG. 1 taken along section lines 3—3; and FIG. 4 is a schematic representation of a control system using an actuator of the type here involved.

Figure 1:
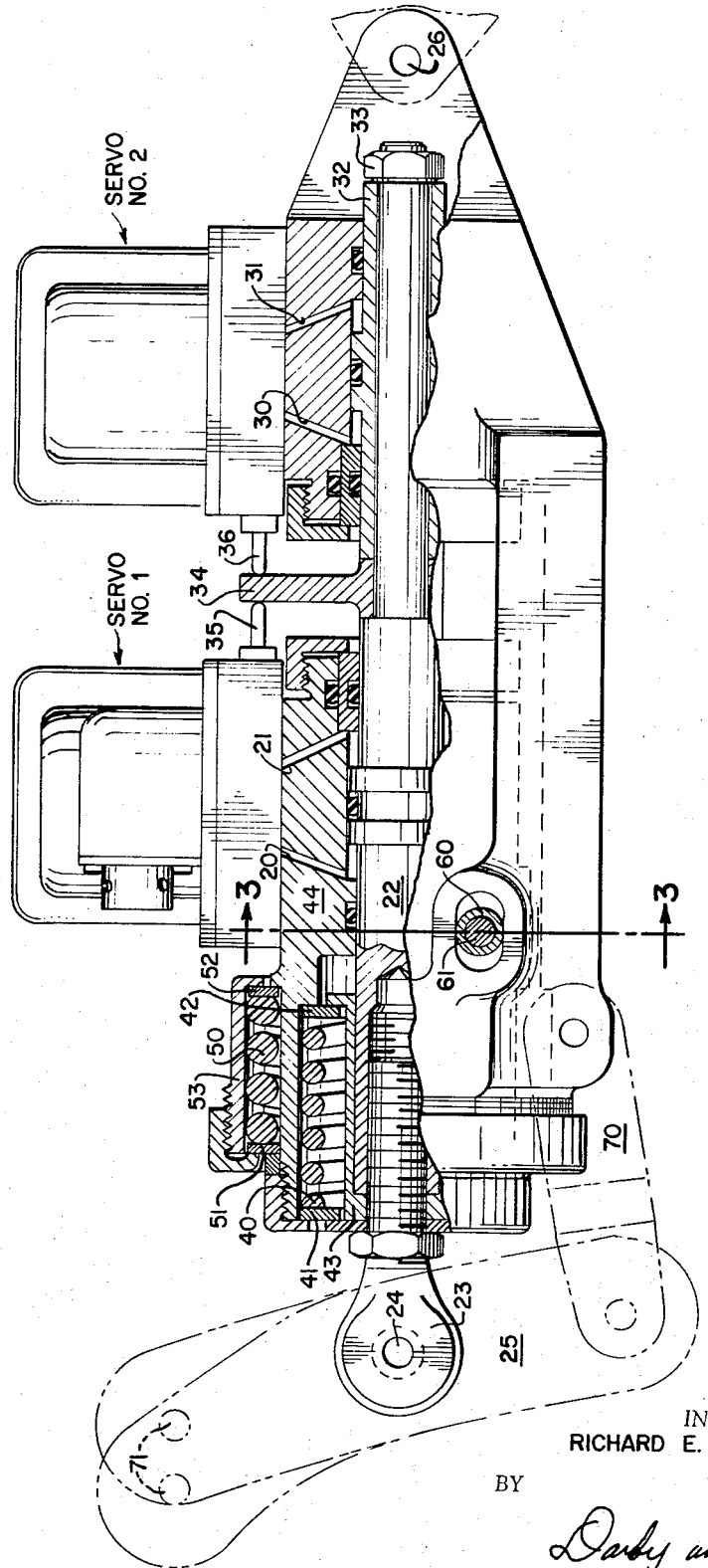
FIG. 1 is a longitudinal elevation, partly in section, of one form of actuator disclosed and claimed in this application.

Referring first to FIG. 4, this schematic illustrates an automatic pilot control system and triple redundant type actuator of the general class herein disclosed and claimed. Radar inputs feed into the automatic pilot signal unit 100 which analyzes them to determine whether the aircraft should go into a slight climb or dive, or slight right or left bank turn, or slight yaw correction angle, dependent on the particular application of the actuator involved. The automatic pilot signal unit 100 analyzes the radar signals and transmits input A to servo valve 1, input B to servo valve 2 and input C to the comparator 3 respectively. These A, B, C, inputs are identical. If both servo units 1 and 2 are functioning properly, they work together to move their respective pistons 1 and 2 the same amount to produce the desired actuator output by moving an output linkage which is connected to the pistons. Although not shown on this schematic, these pistons 1 and 2 are in reality connected to a single linkage by means and for reasons described below. As the servos and piston function to produce a desired output, feed-back indicators 1 and 2 transmit signals representative of this output to the comparator 3. Assuming that servos 1 and 2, and pistons 1 and 2 are working properly, comparator 3 will monitor the proper functioning of these units and allow both systems to function together to control actuator output.

If one or the other of the servo systems malfunctions, this will be picked up by comparator 3 through the action of the affected feed-back indicator, and comparator 3 will deactivate the defective servo system. For example, if servo No. 1 malfunctions for any reason, feed-back No. 1 will transmit a signal showing the improper output to comparator 3, and comparator 3 will compare this signal with its input signal received from the auto-pilot signal unit 100. Analysis of these two signals will show that the servo No. 1 system is malfunctioning, and comparator 3 will deactivate servo system No. 1.

If both servo systems malfunction, comparator 3 will recognize this and deactivate both servo systems. The actuator must then be manually operated to produce the desired output.

Before describing the actuator linkages in detail, it should be pointed out that the automatic pilot signal unit 100, the Nos. 1 and 2 servo-motors and feed-back indicators, the comparator and the hydraulic shut-off valve system are all conventional components. Accordingly, they will not be described in detail. This invention relates primarily to the piston, power cylinders and springs arrangement employed with the actuator and to the means for coupling these various conventional elements with the piston, power cylinders and springs to permit the triple redundant action which is described below.

Hydraulic fluid under high pressure is the actuating force employed in the specific embodiment described herein. Referring to FIG. 2, hydraulic fluid from one hydraulic system continuously flows through servo No. 1, entering pressure nipple 10, passing through the actuator and then returning to the circulating hydraulic system through output nipple 11. A similar arrangement employing a separate and independent hydraulic system (pressure nipple 12 and return nipple 13) exists with respect to servo motor No. 2, which is also shown in FIG. 2 of the application.

Referring to FIG. 1 and more particularly to servo motor No. 1, when this hydraulic fluid passes through the actuator, it may be directed through either channel 20 or channel 21, so as to exert a pressure on piston 22 either to the right or left respectively. That is, if hydraulic fluid is directed through channel 20, the pressure exerts the force against the left face of piston 22 and thereby pushes piston 22 toward the right. On the other hand, if the hydraulic fluid is directed through channel 21, the pressure is exerted against the right face of piston 22, thereby forcing the piston 22 toward the left.

Piston 22 has a connection link 23, having a connection point 24 at its extreme left end which is pivotally connected to lever 25. The other actuator connection point 26 is at the opposite end of the actuator. Lever 25 is the output lever which is connected to the suitable aircraft's control surfaces for making the necessary attitude corrections for the particular actuator involved. Hydraulic fluid is directed to either channel 20 or channel 21 in response to input A from the automatic pilot signal unit (FIG. 4), to change the distance between these connection points 24 and 26, and thereby to reposition lever 25. For example, if this particular actuator is used for controlling elevation of the aircraft, and if for example the radar input indicates that the plane is in a slight downward attitude, this information is transmitted to and analyzed by the automatic pilot signal unit 100 (FIG. 4) which then transmits input A to servo motor No. 1 to move the actuator so as to cause a slight change in aircraft control surfaces to correct the attitude of the aircraft, in this case to slightly climb the aircraft.

Servo No. 2 operates in a similar manner. It is dependent on input B from the automatic pilot signal unit (FIG. 4). Hydraulic fluid passes through channels 30 or 31 to exert pressure against the left or right (respectively) faces of piston sleeve 32. Sleeve 32 is fixedly mounted on piston 22 by lock nut 33 and feed-back indicator ring 34. Thus pressure on the right face of sleeve 32 causes piston 22 to move toward the left; whereas pressure on the left face of sleeve 32 causes piston 22 to move toward the right.

When both servo motors Nos. 1 and 2 are functioning properly, both work in tandem to position piston 22 at the desired location. Piston 22 continues to move in the direction of the pressure of channels 20 and 30 or channels 21 and 31 (dependent on the direction corresponding to inputs A and B) until movement of feed-back indicator ring 34 repositions feed-back indicators 35 and 36 causing servo motors Nos. 1 and 2 to stop at a new equilibrium position. When this happens hydraulic flow through the affected channels ceases and the piston 22 maintains this deflected position in proportion to the command signals of inputs A and B. Piston 22 is biased to return to its neutral position (that shown in FIG. 1) by piston centering spring 40 which is housed between retainer rings 41 and 42. Rings 41 and 42 are held between sleeve 43 of piston 22 and the No. 1 servo motor cylinder housing 44.

The above description relates to the system when both servo motors Nos. 1 and 2 are operative. One of the principal advantages of this system becomes apparent when one or the other of the servo motors fails. When this occurs, the defective servo is deactivated and the operative servo motor then carries the deactivated servo so as to control the actuator output signal. If the cylinder of the deactivated servo becomes locked relative to the piston, the entire cylinder is caused to move with the piston. This is accomplished by the cylinder synchronizing spring 50 which is housed between retainer rings 51 and 52. Retainer ring 51 is held against an extension of the No. 2 servo motor cylinder housing 53 and the No. 1 servo motor cylinder housing 44.

For purposes of this description, assume that servo motor No. 1 fails, that the comparator 3 detects the failure and accordingly deactivates hydraulic fluid flow to servo motor No. 1 in the manner described above with reference to FIGURE 4. Servo motor No. 2 then receives the input signal B directing hydraulic fluid (for example) to channel 30, which causes piston 22 to move toward the right. Servo unit #1, being deactivated, free wheels with servo unit #2. If cylinder housing 44 becomes locked relative to piston 22, as for instance by trapped hydraulic fluid, it moves right along with piston 22. This compresses spring 50, causing movement of cylinder housing 44 relative to cylinder housing 53, and thereby allowing movement of piston 22 relative to cylinder housing 53. Relative alignment of cylinder housings 44 and 53 is reinforced by bushings 60 on shaft 61 which passes through both housings (44 and 53). Bushings 60 and shaft 61 also serve as stops for the relative movement between these two housings.

If, on the other hand, servo system No. 2 fails, essentially the same thing happens, except that cylinder 53 moves with piston 22 and piston 22 moves relative to cylinder housing 44.

If both servo systems fail, piston centering spring 40 returns piston 22 and cylinder housings 44 and 53 to their neutral position (that shown in FIG. 2) and the entire linkage must be moved by an outside force. Movement is caused by application of the input force on the linkage applied at the pivotal connection point 26.

Output lever 25 is pivoted about arm 70 which is pivotally connected to the No. 2 servo cylinder housing 53. This is done to multiply the output signal lever 25. This pivotal mounting arrangement of lever 25 relative to connecting link 23 and arm 70 can be arranged to produce a 2:1, 3:1 or any desired multiple of output at the connection point 71 of lever 25.

While this description has dealt primarily with a particular embodiment, it should be understood that this embodiment can be altered and modified by means obvious to those skilled in the art to accomplish the same result with substantially the same structure and thus still be within the scope of this invention. For example, power supply means other than servo motors and employing media other than hydraulic force are available alternatives. Also piston centering means and cylinder aligning means could employ forces other than spring forces, and could have these forces arranged in a manner different from the specific arrangement shown and described in detail here.

Therefore this patent is not to be limited to the specific embodiment herein described, but rather to the following claims, in which I claim as my invention:

1. An actuator comprising in combination:
   a first power cylinder,
   a second power cylinder,
   a cylinder aligning means for positioning said cylinders realtive to each other,
   piston means movably positioned within said power cylinders for tandem actuation by said cylinders,
   a first connection point connected to said first power cylinder,
   a second connection point connected to said piston means,
   first power supply means for actuating said first power cylinder to move said piston means relative to said cylinder, second power supply means for actuating said second power cylinder to move said piston means relative to said cylinder, position indicator means for sensing the position of each of said cylinders relative to said piston means, and activating means responsive to said indicator means to activate and de-activate each of said power supply means dependent on said relative positions of the corresponding cylinder to said piston means.

2. An actuator as claimed in claim 1 wherein cylinder aligning means comprises means for moving said cylinders relative to each other and each of said power supply means provides sufficient power to override said aligning means and move said cylinders relative to each other when one of said cylinders is immobile relative to said piston means.

3. An actuator as claimed in claim 1 further comprising means for centering said piston means in a predetermined position relative to said cylinder when both of said power supply means are de-activated by said activating means.

4. An actuator as claimed in claim 2 further comprising means for centering said piston means in a predetermined position relative to said cylinder when both of said power supply means are de-activated by said actuating means.

5. An actuator comprising in combination:
a first power cylinder,
a second power cylinder,
a cylinder aligning means for movably positioning said cylinders coaxially relative to each other,
a piston movably positioned on the central axis of said power cylinders for tandem actuation by said cylinders,
means for centering said piston in a predetermined neutral position relative to said cylinders,
a first connection point connected to said first power cylinder,
a second connection point connected to said piston,
first power supply means for actuating said first power cylinder to move said piston relative to said cylinder,
second power supply means for actuating said second power cylinder to move said piston relative to said cylinder,
position indicator means for sensing the position of each of said cylinders relative to said piston, and
activating means responsive to said indicator means to activate and de-activate each of said power supply means dependent of said relative positions of the corresponding cylinder to said piston,
said piston centering means returning said piston to said predetermined neutral position when both of said power supply means are de-activated by said activating means, and
each of said power supply means providing sufficient power to override said cylinder aligning means when one of said cylinders is immobile relative to said piston.

6. An actuator as claimed in claim 5 wherein said cylinder aligning means comprises a spring force exerted between said power cylinders along an axis coaxial with the axis of said cylinders and said piston.

7. An actuator as claimed in claim 5 wherein said means for centering said piston comprises a spring force exerted between said cylinders and said piston along an axis coaxial with the axis of said cylinders and said piston.

8. An actuator as claimed in claim 6 wherein said means for centering said piston comprises a spring force exerted between said cylinders and said piston along an axis coaxial with the axis of said cylinders and said piston.

9. An actuator as claimed in claim 8 wherein said piston comprises two pairs of lands against which the force of said power supply means is applied, said two pairs of lands corresponding to said two power supply means.

10. An actuator as claimed in claim 9 wherein each of said power supply means comprises an independent hydraulic pressure system.

No references cited.

EDGAR W. GEOGHEGAN, *Primary Examiner.*